No. 825,976. PATENTED JULY 17, 1906.
A. E. NEIGLICK.
KNIFE.
APPLICATION FILED DEC. 11, 1905.
3 SHEETS—SHEET 3.
Fig. 7.
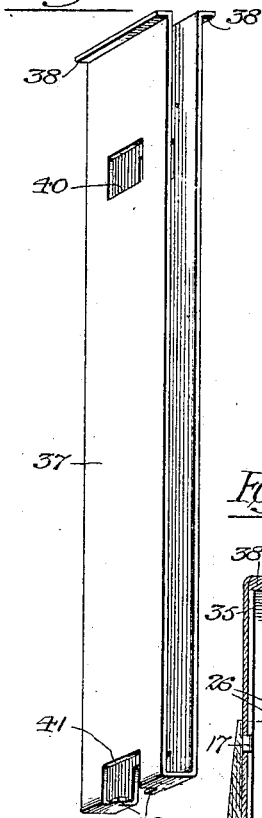
Fig. 8.
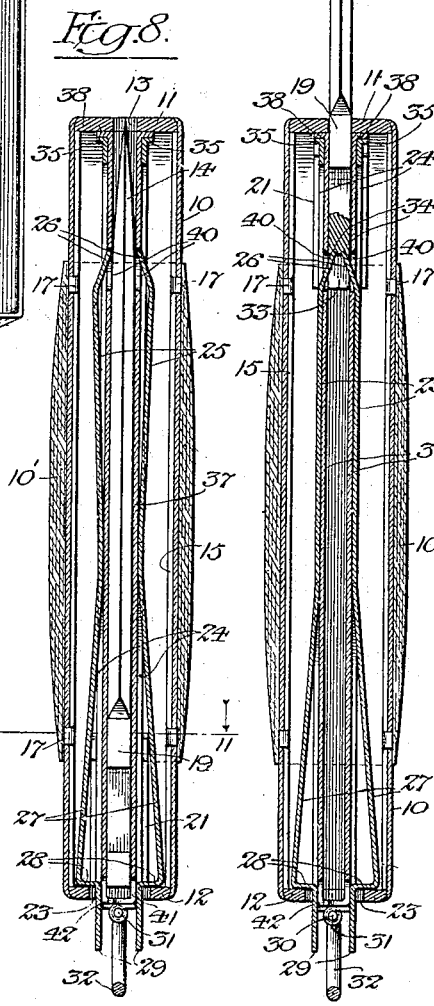
Fig. 9.
Fig. 10.
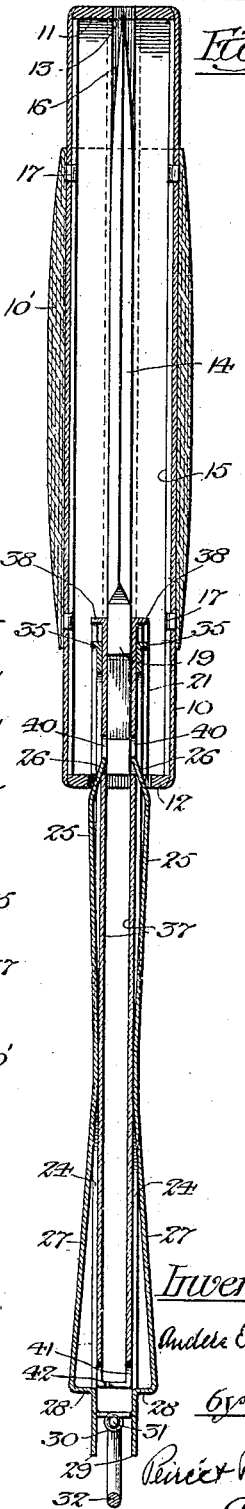
Witnesses:
Inventor:
Andrew E. Neiglick
by
Perce + Fisher
Attys.

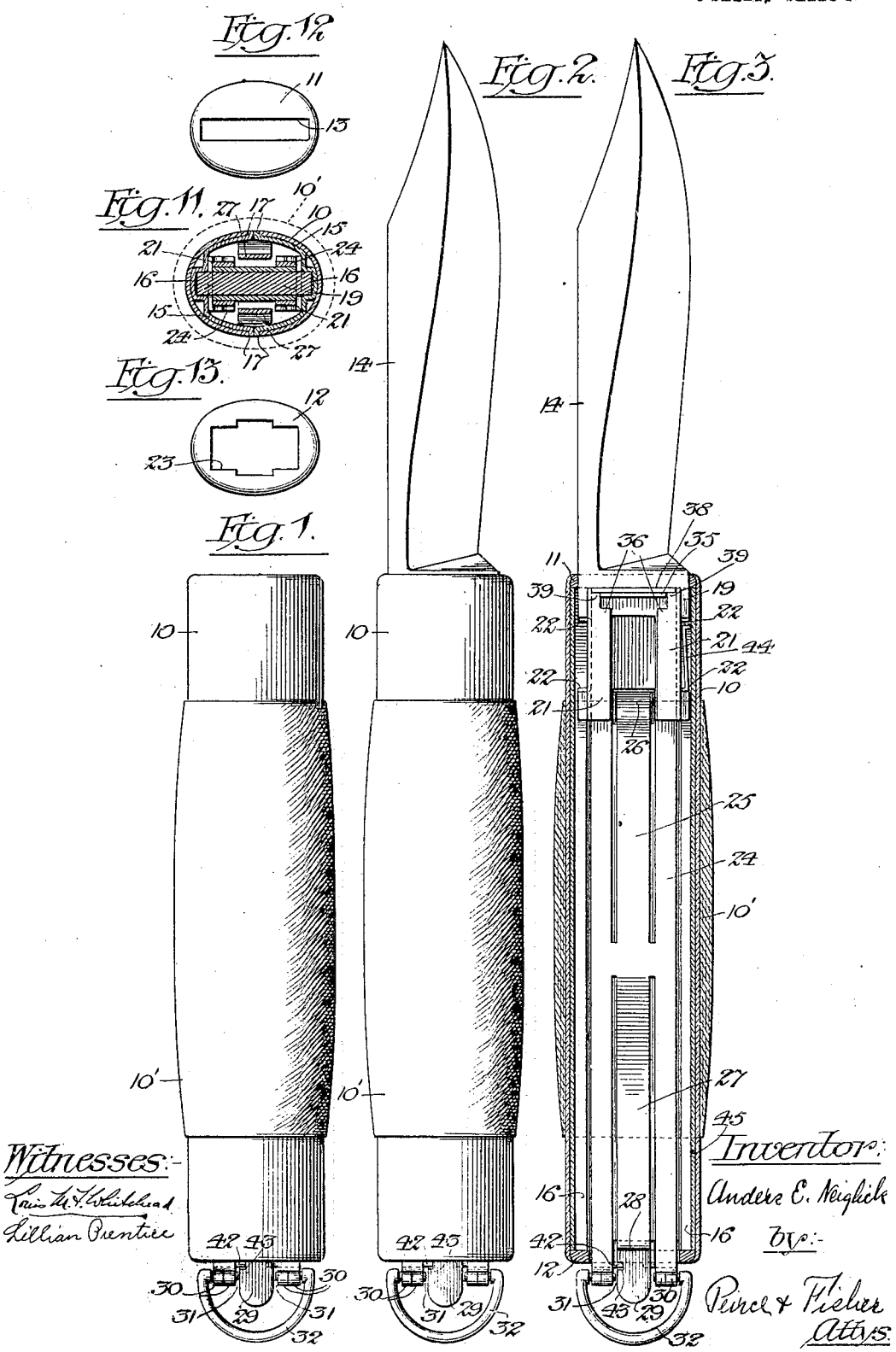

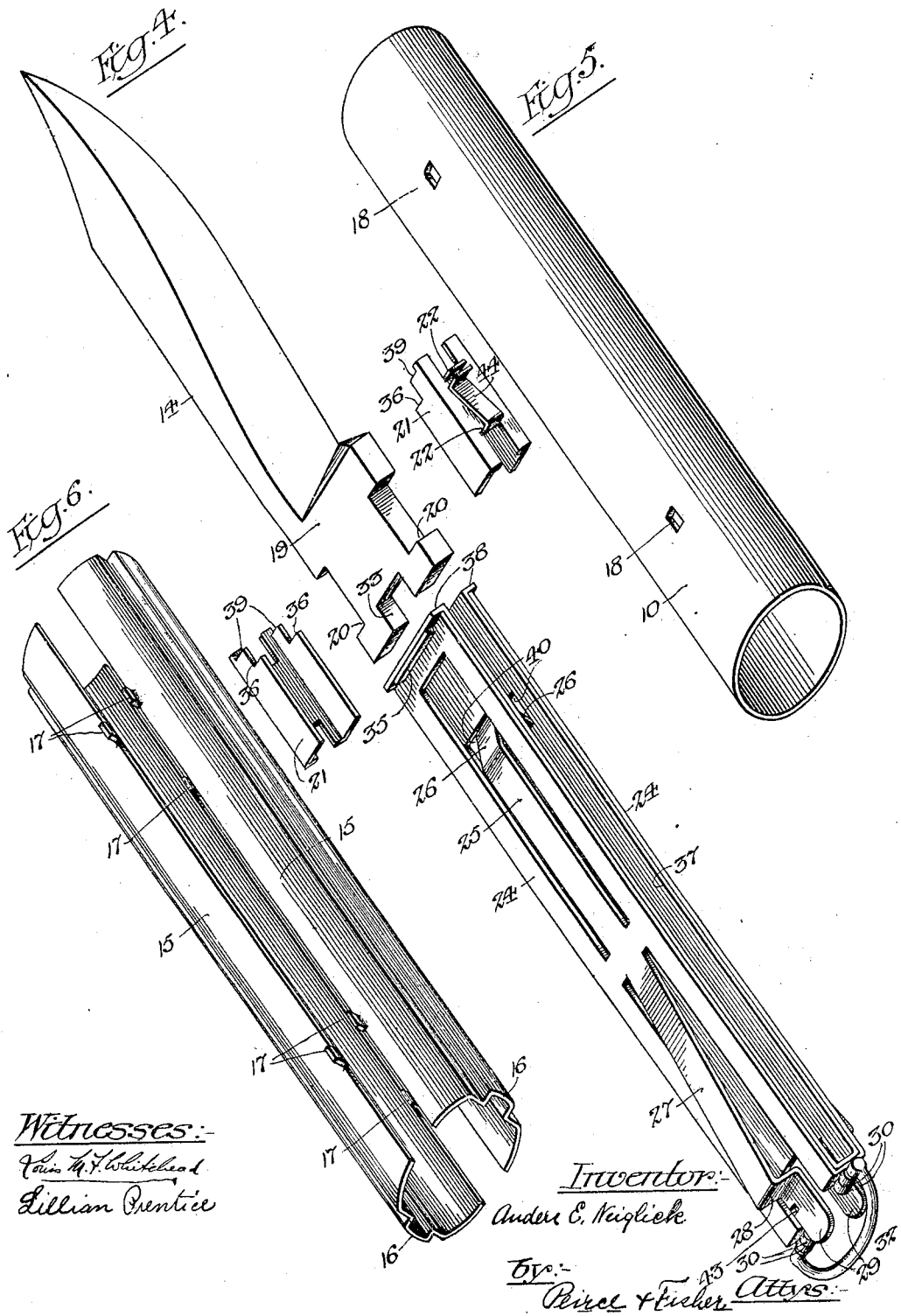

UNITED STATES PATENT OFFICE.

ANDERS E. NEIGLICK, OF CHICAGO, ILLINOIS.

KNIFE.

No. 825,976.  Specification of Letters Patent.  Patented July 17, 1906.

Application filed December 11, 1905. Serial No. 291,204.

*To all whom it may concern:*

Be it known that I, ANDERS E. NEIGLICK, a citizen of the United States, and a resident of Chicago, county of Cook, and State of Illinois, have invented certain new and useful Improvements in Knives, of which the following is declared to be a full, clear, and exact description.

The invention relates to knives of that type in which the blade may be incased within a suitable handle, but which when in use is rigidly secured in projected position within the end of the handle.

The improvement seeks to provide a simple and effective construction in which the knife-blade may be readily and quickly projected from the handle and securely held in projected position and in which the knife-blade may be also easily drawn into the handle.

A further object of the invention is to provide a simple inexpensive arrangement of operating parts which may be easily and quickly assembled within the knife-handle.

With these objects in view the invention consists in the features of construction, combinations, and arrangements of parts hereinafter set forth, illustrated in the accompanying drawings, and more particularly pointed out in the appended claims.

In the drawings, Figure 1 is a side view of the improved knife with the parts incased within the handle. Fig. 2 is a similar view thereof, showing the knife-blade projected for use. Fig. 3 is a view similar to Fig. 2, with the handle in section to show the operating parts. Fig. 4 is a perspective view of the knife-blade and its operating parts shown separated from one another to illustrate the manner in which they are assembled. Fig. 5 is a perspective view of the shell forming the tubular handle. Fig. 6 is a perspective view of the sectional lining of the handle provided with grooves in which the blade slides. Fig. 7 is a perspective view of the U-shaped releasing-slide. Fig. 8 is a sectional view of the improved knife, showing the blade and operating parts incased within the handle. Fig. 9 is a similar view showing the blade projected from the handle. Fig. 10 is a similar view showing the blade drawn into the handle and the operating parts withdrawn therefrom. Fig. 11 is a cross-section on line 11 11 of Fig. 8. Figs. 12 and 13 are views of the opposite end pieces of the handle.

The knife-handle preferably comprises a tubular metal shell 10, as illustrated in Fig. 5, which is preferably of oval cross-section. The end pieces 11 and 12, which are illustrated in Figs. 12 and 13, are set within the ends of the tube 10, and the metal of the latter is crimped over the end pieces to hold them in place, as illustrated in Figs. 3 and 8. The tubular handle 10 is preferably provided with a cover or gripping portion 10', of leather or suitable material, that terminates somewhat short of its ends. The end piece 11 is provided with a cross-slot 13, through which the knife-blade 14 is arranged to project. The knife-blade is arranged to slide in suitable guide grooves or ways within the handle, and these grooves are preferably formed upon an inner lining that comprises separate sections 15, that are of sheet metal and bent to proper semi-oval shape to fit within the tubular shell or handle 10. The mid-portion of each of the sections 15 is shaped to form a suitable guide-groove 16, and the edges of these sections have outwardly-projecting lugs 17, that set within openings 18 in the tube or handle 10, so that the guide-grooves 16 are securely held in proper relation opposite each other. The inner end of the steel blade 14 is provided with an integral rectangular portion 19 of uniform thickness that sets snugly within the guide-groove 16, so that the blade is securely held against twisting.

The side edges of the squared portion 19 at the inner end of the blade are provided with notches 20. A pair of U-shaped clips 21, which may be conveniently formed of sheet-brass cut and bent to proper form, set over the side edges of the squared portion 19, and outwardly-projecting lugs 22 on the outer faces of the clips engage the shoulders at the ends of the notches 20, (see Fig. 3,) so that the knife-blade is compelled to move longitudinally with the clips 21.

The shifter for projecting the knife-blade from the handle is arranged to slide within the handle and to project therefrom, preferably through an opening 23 (see Fig. 13) in the end plate 12. This shifter preferably comprises the sections 24, that are preferably formed of spring-steel. At its inner end the central portion of each section of the shifter is cut away to form a spring tongue or finger 25. The upper or inner ends of the spring-tongue 25 are bent inwardly, as at 26. At its lower or outer end the central portion of each section 24 of the blade-shifter is cut away to form an outwardly-projecting spring-catch 27, having a shoulder 28 and a finger-piece 29. The outer portions of the sections 24 are bent inwardly toward each other at their lower ends (see Figs. 3 and 4) and are provided with loops 30, extending about the pintles 31 of a loop or ring 32. The blade-shifter is thus practically U-shaped, the separate sections thereof being connected together by the loop or ring 32.

The lower or inner edge of the squared portion 19 of the blade is preferably cut away (see Fig. 4) to form a notch 33, and the ends 26 of the spring tongues or fingers 25 are arranged to project within the notch and engage grooves 34 in the inner face thereof to project the knife-blade 14 and hold it in projected position. (See Fig. 9.) The shoulders 28 of the spring-catches 27 are arranged to engage the inner face of the end plate 12 of the knife-handle (see Figs. 8 and 9) and hold the blade-shifter locked in position within the handle. The finger-pieces 29 of the catches extend outward through the opening 23 of the plate 12 on opposite sides of the ring or loop 32, so that they may be conveniently gripped to release the blade-shifter. It is obvious that the spring-tongues 25 and catches 27 could be formed separate from the main body of the blade-shifter; but, as stated, the latter is preferably formed of spring metal, so that these parts may be formed integral therewith, and thus occupy less space.

The U-shaped clips extend over the side edges of the sections 24 of the blade-shifter, (see Figs. 3, 8, 9, and 10,) and the extreme inner ends of the sections 24 of the shifter are provided with outwardly-projecting lips or lugs 35, that are arranged to engage shoulders 36 on the upper or outer edges of the clips 21, so that the knife may be drawn into the handle by operating the shifter.

Suitable means are provided for releasing the spring 25 from the inner end of the blade 14, so that the blade and blade-shifter may be slid past each other and both incased within the handle. This releasing device preferably comprises a U-shaped slide 37, constructed as illustrated in Fig. 7 and preferably formed of sheet-brass or other suitable metal. This slide is arranged within the sections 24 of the blade-shifter and is provided at its upper end with outwardly-projecting lips or lugs 38, that are arranged to engage shoulders or lugs 39 on the clips 21. (See Figs. 3 and 4.) The slide 37 is also provided adjacent its inner end with openings 40, through which the ends 26 of the spring-tongue 25 are arranged to project into engagement with the knife-blade. The outer or lower end of the slide 37 has its central portion cut away to form a notch 41, through which the shoulders 28 of the springs 27 are arranged to project. The lower connecting portion between the sides of the slide are provided with lugs 42, projecting inwardly and normally in line, (see Figs. 3 and 4) with notches 43 on the side edges of the finger-pieces 29 of the spring-catches 27.

In assembling the parts the lining-sections 15 may be readily set within the tubular handle 10 and the lugs 17 of the sections interlocked with the openings 18 of the tubular handle. The end plate 11 may then be set within one end of the handle, the blade is placed between the sides of the U-shaped slide 37, and the latter is arranged between the sections 24 of the U-shaped blade-shifter. The clips 21 are then set over the side edges of the blade-shifter and slide with the lugs 22 thereof engaging the ends of the notches 20 in the inner end of the knife-blade. The operating parts thus assembled may be set within the handle, with the side edges of the squared portion 19 of the knife-blade engaging the guide-grooves 16, and the lower or outer cap-plate 12 may be then fixed in place.

In the normal inoperative position of the knife (shown in Fig. 8) both the knife-blade and the operating parts are incased within the handle. To prevent the blade from dropping out, one of the lugs 22 on one of the clips 21 is bent upwardly and outwardly to form a spring-catch 44, (see Fig. 4,) that is arranged to engage a groove 45 (see Fig. 3) at the lower or outer end of one of the guide-channels 16. When the knife is drawn into the casing, the edge of the spring-catch 44 will engage the groove 45 and prevent the knife from dropping out. In this position also the flanges or lips 38 (see Fig. 8) on the slide 37 abut against the end plate 11, the projections or lips 35 on the blade-shifter sections 24 abut against the lips or flanges 38, and the slide and blade-shifter are snugly held in position by the engagement of the shoulders 28 on the spring-catches 27 with the inner face of the end plate 12. In this position the lower or outer end of the slide 37 is against the lower or outer end of the blade-shifter, as indicated in Fig. 4, and the lugs 42 on the slide are in line with the notches 43 in the catches 27. In this position, too, the ends 26 of the spring-fingers 25 extend through the openings 40 in the slide and engage the sides of the knife-blade 14, and the extreme upper edges of these fingers are adjacent the upper edges of the openings 40. To project the knife from the handle, the user will press the finger-pieces 29 of the catches 27 inwardly between his thumb and finger, so that the shoulder 28 thereon will disengage from the end plate 12 and at the same time notches 43 on the finger-pieces will engage the lug 42 on the slide 37, so that the slide and blade-shifter are locked together. These parts may be then drawn outwardly, and as soon as the ends 26 of the fingers 25 reach the notch 33 on the inner edge of the knife-blade the ends of fingers 25 drop into the notch, so that when the operating parts are again thrust into the handle the blade will be projected outwardly into the operative position. (Shown in Figs. 3 and 9.) The reëngagement of the shoulders 28 of the springs 27 with the end plate 12 will securely lock the knife-blade in its projected position. The spring-catch 44, that normally holds the knife-blade within the handle, while sufficiently strong to prevent accidental displacement of the blade, will yield and be disengaged from the notch 45 when the blade is pushed outwardly by the spring-fingers 25. In the outermost position of the parts, as most clearly shown in Fig. 3, the shoulders or lugs 39 on the clips 21, that shift with the knife-blade, are against the lips or flanges 38 upon the slide 37; but the lips or flanges 35 are spaced some distance apart from the shoulders or lugs 36 on the clips, so that the blade-shifter whereon the lips 35 are mounted may be moved outwardly to a slight extent independently of the knife-blade and slide to take up the lost motion between the flanges 35 and the lugs or shoulders 36. To return the knife-blade into the handle, the user will again release the catches 27 by pressing in the finger-pieces 29, but will not press the latter inwardly a sufficient distance to engage the notches 43 thereof with the lugs 42 on the slide 37. Then by pulling outwardly on the shifter the lost motion between the lips 35 on the inner end thereof and the lugs 36 on the clips 21 will be taken up. This slight relative movement between the blade-shifter and the slide 37 will draw the ends 26 of the spring tongues or fingers 25 against the edges of the openings 40 in the slide 37, so that they will be forced outwardly and out of line with the end of the blade. The continued outward movement of the blade-shifter after the engagement of the flanges 35 thereof with the shoulders 36 of the clips 21 will draw the blade within the handle, as shown in Fig. 10. The spring-catches 27 may be then pressed together, so that the shoulders 28 thereof will engage the lugs 42 on the slide 37, and since the ends of the spring-fingers 25 are held out of line with the end of the blade the shifter may be slid into the handle on opposite sides of the blade and back into the position indicated in Fig. 8. When the blade-shifter is thrust home into the handle and the catches 27 thereof are again in engagement with the end plate 12 of the handle, the lost motion between the blade-shifter and the slide will be taken up, since the latter is first arrested by the engagement of its inner end with the end plate 11 of the handle, so that the spring-fingers 25 are released and the parts are in such position that by pressing the finger-pieces 29 together to lock the shifter and slide together in the released position of the spring-fingers these parts may be quickly drawn out and thrust back into the handle to project the knife-blade and lock it in projected position.

It is obvious that numerous changes may be made in the details of structure without departure from the essentials of the invention.

Having described my invention, what I claim as new, and desire to secure by Letters Patent, is—

1. A knife comprising a handle, a blade slidably mounted within said handle, a sliding shifter for the blade within the handle having means at its inner end for detachably engaging the inner end of the blade and a spring-catch for releasably holding said shifter within the handle, substantially as described.

2. A knife comprising a handle, a blade sliding within said handle, a blade-shifter also sliding within said handle the inner end of which is arranged to engage the inner end of said blade to project the same from the handle and means for disengaging the end of the shifter from the blade, whereby said shifter may slide past the blade and be incased therewith in the handle, substantially as described.

3. A knife comprising a handle, a blade and blade-shifter sliding within said handle and arranged to project from opposite ends thereof, the inner end of said shifter being arranged to engage the inner end of the blade to project the same from the handle, means for disengaging the shifter from the blade, and a spring-catch for holding the shifter in place within the handle, substantially as described.

4. A knife comprising a handle, a blade and a blade-shifter sliding within the handle, said shifter having a spring-finger on its inner end arranged to engage the inner end of the blade to project the same from the handle, means for releasing said spring-finger and a releasable spring-catch for holding said shifter in place, substantially as described.

5. A knife comprising a handle, a blade and a blade-shifter sliding within the handle, said shifter having a spring-finger on its inner end arranged to engage the inner end of the blade to project the same from the handle, and said shifter having a releasable spring-catch at its outer end arranged to engage the end of the handle and hold said shifter in place, and means for releasing said spring-finger, substantially as described.

6. A knife comprising a handle, a blade and a blade-shifter sliding within said handle, the inner end of said shifter being arranged to engage the inner end of the blade to project the same from the handle and a slide shiftable with said blade and shifter and arranged to disengage said parts, substantially as described.

7. A knife comprising a handle, a blade and a blade-shifter sliding within said handle and arranged to overlap therein and to project from opposite ends thereof, said shifter having means at its inner end for engaging and projecting said blade, a slide controlled by said shifter for disengaging said means, and a spring-catch for holding said shifter and slide in place within said handle, substantially as described.

8. A knife comprising a handle, a blade and a blade-shifter sliding within said handle, said shifter having a spring-finger on its inner end arranged to engage said blade and project it from the handle, and a slide having an opening through which said spring-finger extends, said shifter being movable relatively to said blade and slide to disengage said spring-finger from the blade, substantially as described.

9. A knife comprising a handle, a blade and a blade-shifter sliding within said handle, said shifter having a spring-finger on its inner end arranged to engage said blade and projecting it from the handle, a slide between said shifter and blade having an opening through which said spring-finger extends into engagement with said blade, said shifter being movable relatively to said slide and blade to disengage said spring-finger and means for locking said slide and shifter together to hold said finger in position to engage and project said blade, substantially as described.

10. A knife comprising a handle, a blade and a blade-shifter sliding within said handle and arranged to project from opposite ends thereof, said shifter having means at its inner end for engaging the inner end of said blade to shift the same in opposite directions into and out of said handle, and means for disengaging said blade and shifter so that they may overlap each other and be incased within the handle, substantially as described.

11. A knife comprising a handle, a blade and a blade-shifter, slidably mounted within the handle, means for connecting the blade and blade-shifter to move together in opposite directions, means for disengaging said parts to permit them to slide past each other into the handle and a releasable spring-catch for holding the shifter in place, substantially as described.

12. A knife comprising a handle, a blade and a blade-shifter sliding within said handle and arranged to overlap therein and to project from opposite ends thereof and means releasably connecting the inner ends of said blade and shifter together, whereby said blade may be projected and held in projected position and withdrawn into the handle by the operation of said shifter, substantially as described.

13. A knife comprising a handle, a blade and a blade-shifter sliding within said handle and arranged to project from opposite end thereof and to overlap each other within the handle, means for releasably connecting the inner ends of said blade and shifter to move in opposite directions together into and out of the handle, and a releasing-slide controlled by said shifter to disengage the latter from the blade, substantially as described.

14. A knife comprising a handle, a blade and a blade-shifter sliding within said handle and projecting in opposite directions therefrom, said shifter and blade having engaging lugs at their inner ends for withdrawing the blade into the handle, and said shifter having a spring-finger for releasably engaging the end of said blade to project it from the handle, means for releasing said finger and a releasable spring-catch for holding said shifter in place within the handle, substantially as described.

15. A knife comprising a handle, a blade and a blade-shifter sliding within said handle and projecting in opposite directions therefrom, said shifter and blade having engaging lugs at their inner ends for withdrawing the blade into the handle, and said shifter having a spring-finger for releasably engaging the end of said blade to project it from the handle and a shifting slide controlled by the shifter for releasing said spring-finger, said shifter having a releasable spring-catch at its outer end for holding it in place within the handle, substantially as described.

16. A knife comprising a handle, a blade sliding therein, a flat blade-shifter of spring metal having an integral spring-finger at its inner end for releasably engaging and projecting the blade and an integral spring-catch for releasably engaging the handle, substantially as described.

17. A knife comprising a handle, a blade sliding therein, a flat blade-shifter of spring metal having an integral spring-finger at its inner end for releasably engaging and projecting the blade and an integral spring-catch for releasably engaging the handle, and a flat metal slide between the blade and shifter arranged to disengage said finger from the blade, substantially as described.

18. A knife comprising a handle, a blade sliding within the handle and arranged to project from one end thereof, a blade-shifter having sections on opposite sides of said blade, means for releasably connecting the inner ends of said shifter-sections to the inner end of said blade and a releasable catch for holding the same in place, substantially as described.

19. A knife comprising a handle, a blade sliding within the handle and arranged to project from one end thereof, a blade-shifter having sections on opposite sides of said blade, means for releasably connecting the inner ends of said shifter-sections to the inner end of said blade, a slide having sections on opposite sides of the blade for disengaging the shifter therefrom and releasable catches for holding the shifter and slide in place within the handle, substantially as described.

20. A knife comprising a handle, a blade sliding within the handle and arranged to project from one end thereof, a U-shaped blade-shifter extending on opposite sides of the blade and arranged to project from the opposite end of the handle, said shifter having spring-fingers at its inner end for engaging the inner end of said blade to project it from the handle and said shifter having releasable spring-catches at its outer end to hold the same in place within the handle substantially as described.

21. A knife comprising a handle, a blade sliding within the handle and arranged to project from one end thereof, a U-shaped blade-shifter extending on opposite sides of the blade and arranged to project from the opposite end of the handle, said shifter having spring-fingers at its inner end for engaging the inner end of said blade to project it from the handle, a U-shaped slide arranged between said shifter and blade and arranged to disengage said spring-fingers and a releasable catch for holding said shifter in place, substantially as described.

22. A knife comprising a handle, a blade sliding within the handle and arranged to project from one end thereof, a U-shaped blade-shifter of flat spring metal extending on opposite sides of said blade and arranged to project from the opposite end of said handle, said shifter having spring-fingers at its inner end for engaging said blade and spring-catches at its outer end for engaging the handle and a U-shaped slide of flat metal arranged between the shifter and blade and having openings through which said fingers project, said shifter and slide being relatively movable to disengage said fingers from said blade and having means for locking the slide and shifter together to prevent the disengagement of the fingers, substantially as described.

23. A knife comprising a handle, a blade sliding within the handle, a shifter therefor having a spring-finger for engaging the blade to project it from the handle, a slide, said shifter and slide having lugs or flanges at their inner ends, a shouldered part connected to the inner end of the blade with which said lugs or flanges engage, said slide and shifter being relatively movable to disengage said spring-fingers and a releasable catch for holding said shifter in place, substantially as described.

24. A knife comprising a handle, a blade sliding within said handle and arranged to project from one end thereof, a U-shaped shifter extending on opposite sides of said blade and arranged to project from the opposite end of said handle, said shifter having spring-fingers at its inner end for engaging and projecting said blade, a U-shaped slide between said blade and shifter, having openings through which said fingers project, said slide and shifter having lugs or flanges on their inner ends, a shouldered part connected to said blade with which said lugs or flanges engage, said shifter having spring-catches at its outer end for releasably holding it in place within the handle, substantially as described.

25. A knife comprising a tubular handle having guideways therein, a blade arranged to slide in said guideways and project from one end thereof a blade-shifter within the handle arranged to project from the opposite end of the handle and having a spring-finger at its inner end for releasably engaging the blade and a spring-catch at its outer end for releasably engaging the handle, substantially as described.

26. A knife comprising a tubular metal handle, a metal sectional lining therefor interlocked therewith and having guide grooves or ways a blade shiftable within said grooves or ways and arranged to project from one end thereof, operating devices for projecting said blade and locking it in projected position and cap-plates at the ends of said tubular handle, substantially as described.

27. A knife comprising a handle, a blade sliding within said handle having notches on its sides at its inner end, clips set within said notch a blade-shifter having a lug or flange engaging said clips and a spring-finger arranged to engage and project said blade, means for releasing said fingers and a releasable catch for holding said shifter in place within the handle, substantially as described.

ANDERS E. NEIGLICK.

Witnesses:
LILLIAN PRENTICE,
KATHARINE GERLACH.